(12) United States Patent
Kasama

(10) Patent No.: US 7,728,305 B2
(45) Date of Patent: Jun. 1, 2010

(54) APPARATUS HAVING AN INPUT DEVICE AND A DISPLAY, METHOD OF CONTROLLING APPARATUS AND COMPUTER-READABLE RECORDING MEDIUM

(75) Inventor: Koichiro Kasama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 77 days.

(21) Appl. No.: 12/068,461

(22) Filed: Feb. 6, 2008

(65) Prior Publication Data

US 2008/0203315 A1     Aug. 28, 2008

(30) Foreign Application Priority Data

Feb. 22, 2007     (JP)     ............... 2007-041870

(51) Int. Cl.
  *G01J 1/42*     (2006.01)
(52) U.S. Cl. ..................................... 250/372
(58) Field of Classification Search .................. 250/372
  See application file for complete search history.

(56) References Cited

U.S. PATENT DOCUMENTS 4,882,598 A * 11/1989 Wulf ....................... 250/338.1

5,151,600 A * 9/1992 Black ......................... 250/372
2004/0043760 A1 * 3/2004 Rosenfeld et al. ........ 455/414.3
2005/0236576 A1 * 10/2005 Yagi ............................ 250/372
2005/0288038 A1    12/2005 Kim

FOREIGN PATENT DOCUMENTS

JP     2006-17708     1/2006

* cited by examiner

*Primary Examiner*—David P Porta
*Assistant Examiner*—Kiho Kim
(74) *Attorney, Agent, or Firm*—Staas & Halsey LLP

(57) ABSTRACT

According to an aspect of an embodiment, an apparatus having an input device for inputting information and a display for displaying information comprises, a storage for storing information corresponding to an ultra violet ray intensity in association with location information and time information and a processor for obtaining information of an ultra violet ray intensity on the basis of location information and time information inputted by the input device in reference to the information stored in the storage, and for displaying the obtained information of the ultra violet ray intensity on the display.

16 Claims, 16 Drawing Sheets

| Position ID | Position | Latitude | Longitude |
|---|---|---|---|
| 01 | Sapporo | 43° 04′ N | 141° 21′ E |
| 02 | Tokyo | 35° 40′ N | 139° 46′ E |
| 03 | Naha | 26° 13′ N | 127° 41′ E |
| — | — | — | — |
| — | — | — | — |

Fig.4

| Position ID | Month | Time | UV Index |
|---|---|---|---|
| 01 | 1B | 4 | 0.0 |
| | | 5 | 0.0 |
| | | 6 | 0.5 |
| | | 7 | 1.0 |
| | | 8 | 1.5 |
| | | 9 | 2.0 |
| | | 10 | 3.0 |
| | | 11 | 3.5 |
| | | 12 | 4.0 |
| | | 13 | 3.8 |
| | | 14 | 3.0 |
| | | 15 | 2.0 |
| | | 16 | 1.0 |
| | | 17 | 0.5 |
| | | 18 | 0.0 |
| | | 19 | 0.0 |
| | 1M | 4 | 0.0 |
| | | — | — |
| | | 19 | 0.0 |

Fig.5

| Position ID | Month | Time | UV Index |
|---|---|---|---|
| | 1E | 4 | 0.0 |
| | | ... | --- |
| | | 19 | 0.0 |
| | 2B | 4 | 0.0 |
| | | ... | --- |
| | | 19 | 0.0 |
| | ... | ... | ... |
| | 12E | 4 | 0.0 |
| | | ... | ... |
| | | 19 | 0.0 |
| 02 | ... | ... | ... |
| | ... | ... | ... |
| | 1B | 4 | 0.0 |
| | | ... | ... |
| | | 19 | 0.0 |
| | ... | ... | ... |
| XX | 12E | 4 | 0.0 |
| | | ... | ... |
| | | 19 | 0.0 |

Fig. 6

| Weather Condition | Intensity Ratio |
|---|---|
| Clear and sunny | 1.00 |
| Fine | 0.95 |
| Obscured sky | 0.88 |
| Cloudiness | 0.58 |
| Rain | 0.32 |

Fig.7

| Skin Type | MEDs |
|---|---|
| Type 1 | 0.2 |
| Type 2 | 0.3 |
| Type 3 | 0.4 |

Fig. 8

APPARATUS HAVING AN INPUT DEVICE AND A DISPLAY, METHOD OF CONTROLLING APPARATUS AND COMPUTER-READABLE RECORDING MEDIUM

BACKGROUND OF THE INVENTION

1. Field of the Invention

The present invention relates to a method for calculating the intensity of ultraviolet (UV) radiation.

2. Description of the Related Art

Japanese Unexamined Patent Application Publication No. 2006-17708 is given as a related art document.

SUMMARY

According to an aspect of an embodiment, an apparatus having an input device for inputting information and a display for displaying information comprises, a storage for storing information corresponding to an ultra violet ray intensity in association with location information and time information and a processor for obtaining information of an ultra violet ray intensity on the basis of location information and time information inputted by the input device in reference to the information stored in the storage, and for displaying the obtained information of the ultra violet ray intensity on the display.

BRIEF DESCRIPTION OF THE DRAWINGS

FIG. 4 is an illustration describing location data;

FIG. 5 is a first illustration describing UV-radiation-intensity data for all days every month;

FIG. 6 is a second illustration describing UV-radiation-intensity data for all days every month;

FIG. 7 is an illustration describing UV-radiation-intensity-ratio data for each weather condition;

FIG. 8 is an illustration describing minimal-erythema-dose data for each skin type;

DESCRIPTION OF THE PREFERRED EMBODIMENTS

The depletion of the ozone layer blocking hazardous UV radiation has been continuing. The amount of hazardous UV radiation that reaches the ground has increased due to the depletion of the ozone layer, so that premature skin aging or skin cancer may be caused. Accordingly, in order to cope with problems due to UV radiation, for example, people need to apply sunscreen on their skin.

Various technologies for coping with the problems due to UV radiation have been suggested. For example, there is a technology that can provide information concerning a current location of a user and the intensity of UV radiation in the vicinity of the location.

However, this technology can provide only the current intensity of UV radiation for the user. Accordingly, the user has to cope with the problems due to UV radiation on the basis of the limited information concerning only the current intensity of UV radiation.

Embodiments according to the present invention will be described with reference to the accompanying drawings.

First Embodiment

Figure 1:
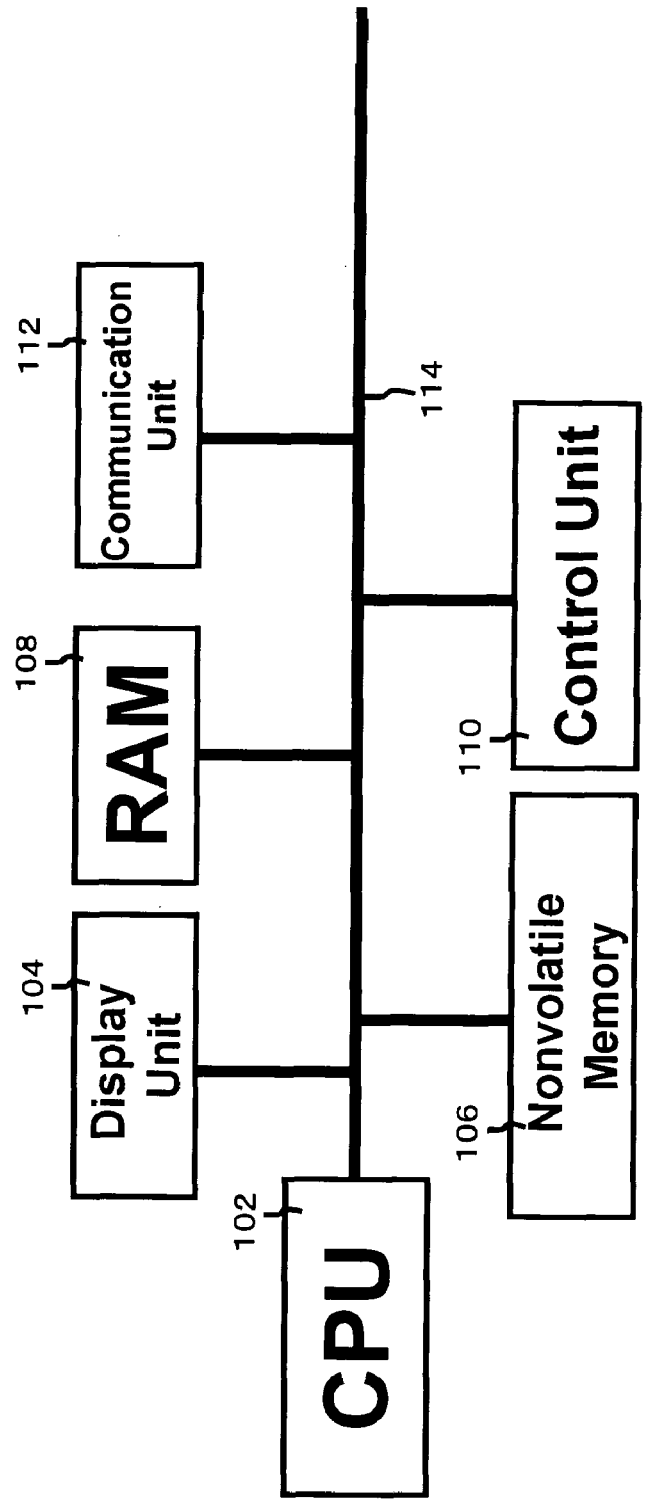
FIG. 1 is a diagram of a hardware configuration of an information terminal.

Hardware Configuration:

FIG. 1 shows a hardware configuration of a portable telephone that is a portable apparatus according to a first embodiment. As shown in FIG. 1, a portable telephone 100 includes a central processing unit (CPU) 102, a display unit 104, a nonvolatile memory 106, a random access memory (RAM) 108, a control unit 110, a communication unit 112, and a bus 114. Each of the units will be described below.

The CPU 102 runs various types of programs including an operating system (OS) and the like loaded into the RAM 108. The RAM 108 is used as an operation area in which the programs read from the nonvolatile memory 106 are run. The display unit 104 displays an image based on an instruction, such as reporting of a calculation result, output from the CPU 102. The nonvolatile memory 106 is, for example, a flash memory, and the various types of programs run by the CPU 102 are stored in the nonvolatile memory 106. The control unit 110 has a detection circuit for detecting operations of a plurality of keys. The detection circuit reports information concerning operated keys to the CPU 102.

Figure 2:
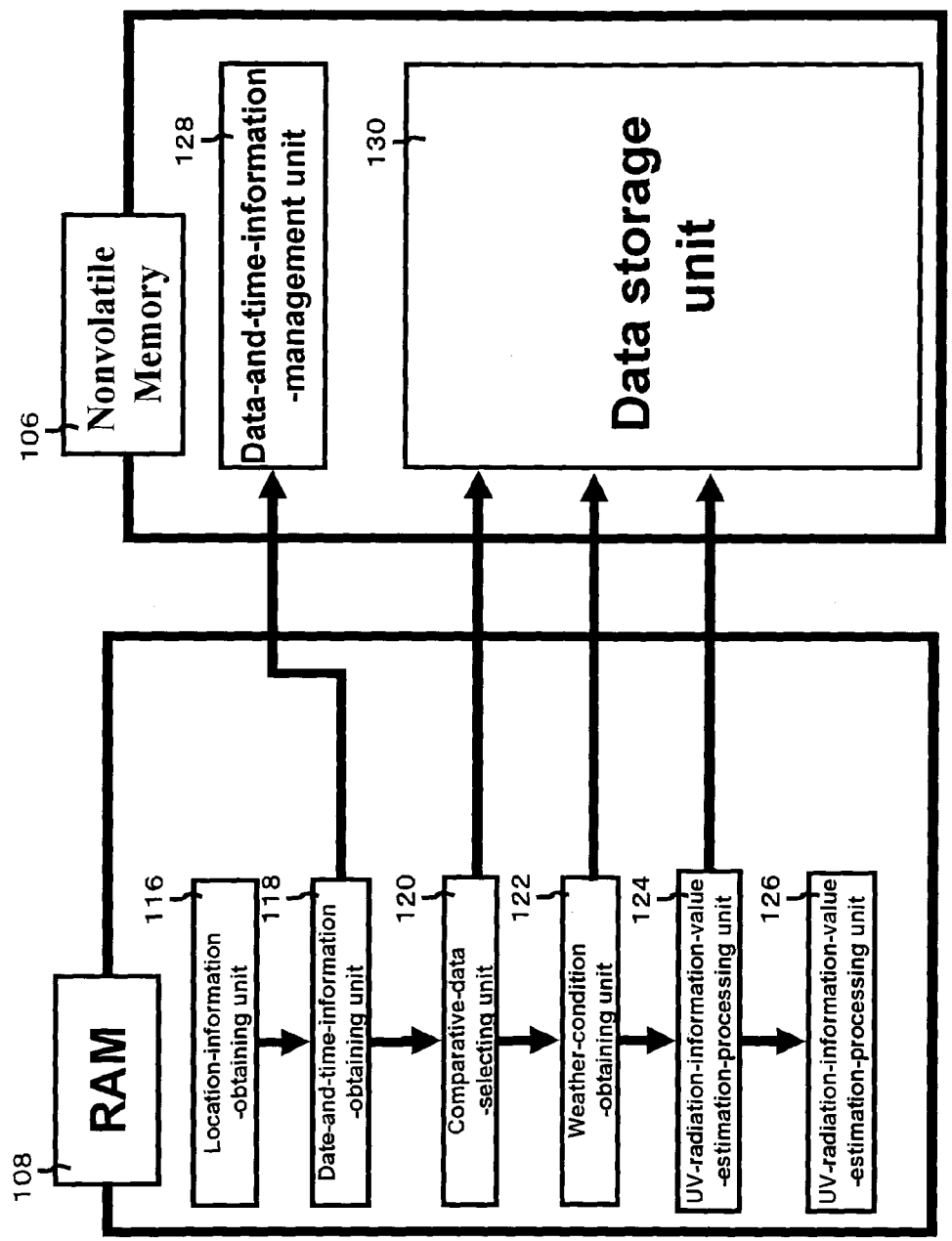
FIG. 2 is a function block diagram of processing of obtaining a UV-information value.
Figure 3:
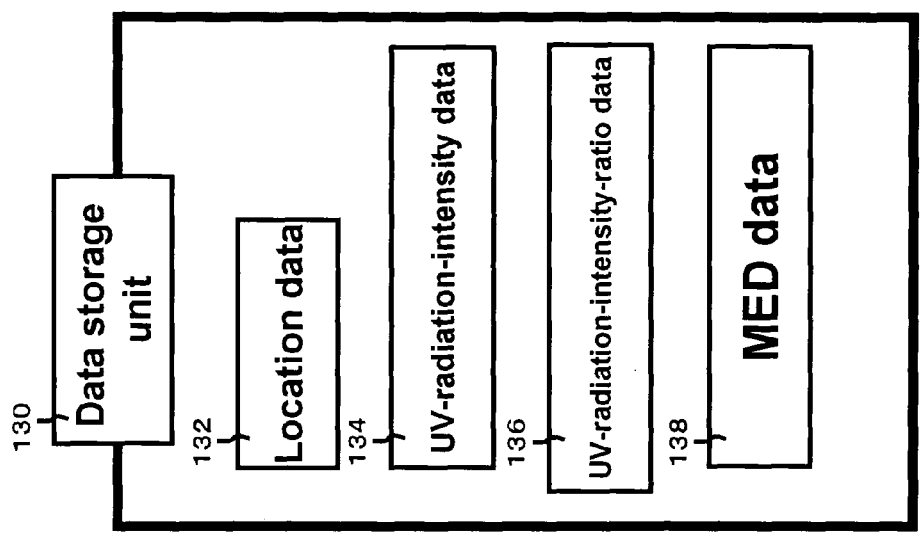
FIG. 3 is a diagram of a data storage unit.

Processing of Estimating UV Information:

FIG. 2 is a function block diagram simply showing an example of processing of estimating information concerning UV radiation. A function of processing of estimating UV radiation information is realized in the RAM 108 and the nonvolatile memory 106. The RAM 108 includes a location-information-obtaining unit 116, a date-and-time-information-obtaining unit 118, a comparative-data-selecting unit 120, a weather-condition-obtaining unit 122, a UV-radiation-information-value-estimation-processing unit 124, and a UV-radiation-information-reporting unit 126. The nonvolatile memory 106 includes a date-and-time-information-management unit 128 and a data storage unit 130. As shown in FIG. 3, the data storage unit 130 includes location data 132, UV-radiation-intensity data 134, UV-radiation-intensity-ratio data 136, and minimal-erythema-dose (MED) data 138. Each of the units will be described below.

The location-information-obtaining unit 116 obtains location information on the basis of information input from the control unit 110 by a user. The location-information-obtaining unit 116 can also obtain the location information through the communication unit 112.

The date-and-time-information-obtaining unit 118 obtains date-and-time information from a date-and-time-information-management unit 128. The date-and-time-informationmanagement unit 128 gives date-and-time information to the date-and-time-information-obtaining unit 118.

The comparative-data-selecting unit 120 obtains Position_ID using the location data 132 on the basis of the location information, which is obtained by the location-information-obtaining unit 116 through the communication unit 112. The location data 132 will be described below.

The weather-condition-obtaining unit 122 obtains a weather condition on the basis of information input from the control unit 110 by the user. The weather-condition-obtaining unit 122 can also obtain the weather condition through the communication unit 112 using a service provided by a weather company.

The UV-radiation-information-value-estimation-processing unit 124 estimates the intensity of UV radiation for an estimated time zone specified by the user. Here, the intensity of UV radiation is represented as, for example, a UV index, and the level of protection against UV radiation is represented as, for example, a sun protection factor (SPF), or a protection grade (PA) of ultraviolet radiation A (UVA).

The UV index is an index representing the intensity of hazardous UV radiation.

The SPF is an index representing a protective effect against ultraviolet radiation B (UVB) light defined as "(an MED in a case where a sunscreen is applied on skin)/(an MED in a case where no sunscreen is applied on skin)". Here, UVB light is an element included in sunlight. When a user is exposed to UVB light, the skin of the user becomes red and sunburned such that the skin starts to peel off. The SPF represents how many times the length of a period until erythema occurs on the skin of the user can be extended in a case where the user is exposed to UV radiation. For example, when an SPF-30 sunscreen is used, the length of the period until erythema occurs can be extended to thirty times that in a case where no sunscreen is used. Accordingly, when a dose of UV-radiation causing erythema to which the user is exposed is smaller than or equal to the MED in a case where a sunscreen is applied on skin, protection against sunburn can be provided. The dose of UV-radiation causing erythema is defined as "25×(UV index)", and the unit of the dose of UV-radiation causing erythema is $[mW/m^2]$.

Using the MED, the UV-radiation-information-value-estimation-processing unit 124 calculates the SPF using the expression "(25×(UV index)×3600×T/1000000)/the MED". Here, the unit of MED is $[KJ/m^2]$. With this calculation, a UV-radiation-information value can be calculated without performing complicated modeling. Accordingly, the UV-radiation-information value can be calculated without using a high-performance CPU, and the number of operations is small, so that the power consumption can be suppressed.

The UV-radiation-information-value-estimation-processing unit 124 determines the PA on the basis of the calculated SPF. The PA is an index representing a protective effect against UVA light. The wavelength of UVA light is longer than that of UVB light. In most cases, when a user is exposed to UVA light, the skin of the user does not become markedly red. While the SPF represents a prevention of redness of the skin, the PA represents a prevention of melanism of the skin. For example, when the SPF is more than or equal to 0 and less than 10, a sunscreen having a protective effect represented as a symbol PA+ should be used; when the SPF is more than or equal to 10 and less than 30, a sunscreen having a protective effect represented as a symbol PA++ should be used; and when the SPF is more than or equal to 30, a sunscreen having a protective effect represented as a symbol PA+++ should be used. The PA has the three grades, and the more "+" signs there are, the greater the protective effect against UVA light.

The UV-radiation-information-reporting unit 126 displays the UV index, the SPF, and the PA, which are calculated or determined by the UV-radiation-information-value-estimation-processing unit 124, on the display unit 104.

FIG. 4 is an illustration describing the location data 132. As shown in FIG. 4, the location data 132 includes Position_ID 202, position data 210, latitude data 212, and longitude data 214. When the location-information-obtaining unit 116 obtains the location information through the communication unit 112, the comparative-data-selecting unit 120 obtains Position_ID using the location data 132 on the basis of obtained latitude and longitude data included in the location information.

FIGS. 5 and 6 are illustrations describing the UV-radiation-intensity data 134 for all days every month. As shown in FIGS. 5 and 6, the UV-radiation-intensity data 134 for all days every month includes the Position_ID 202, months 204, times 206, and UV indices 208. UV indices for each hour were measured on clear days in the past at locations represented by the Position_ID 202, and the average data of the UV indices, i.e., the UV indices 208, are divided into three groups for every month, which are a group of the beginning of a month, a group of the middle of a month, and a group of the end of a month, as the months 204. The data may be updated on a regular basis. The information corresponding to an ultra violet ray intensity is associated with location information and time information.

FIG. 7 is an illustration describing the UV-radiation-intensity-ratio data 136 for each weather condition. As shown in FIG. 7, the UV-radiation-intensity-ratio data 136 includes weather conditions 216 and intensity ratios 218. Each of the intensity ratios 218 is a ratio of the intensity of light having a wavelength such that the ozone layer strongly absorbs UV light from the sun to the intensity of light having a wavelength such that the ozone layer negligibly absorbs UV light. Since the UV indices 208 included in the UV-radiation-intensity data 134 for all days every month are measured under the clear days, in order to obtain a UV index in each weather condition, the multiplication of each of the UV indices 208 by one of the intensity ratios 218 is performed.

Figure 8:
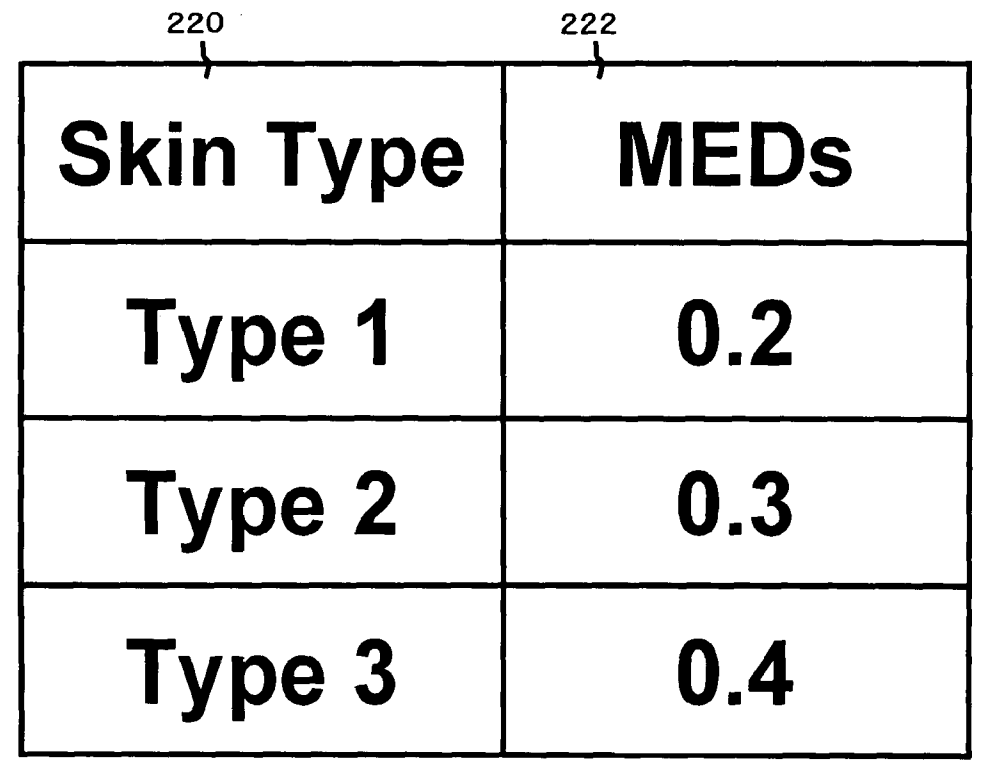

FIG. 8 is an illustration describing the MED data 138 for each skin type. As shown in FIG. 8, the MED data 138 includes skin types 220 and MEDs 222. Each of the MEDs 222 is a minimum amount of light necessary for causing erythema with twenty-four hours of exposure to UVB radiation. Type I is a type of skin that easily becomes red and but difficultly becomes brown by sunburn. Type II is a type of skin that becomes red by sunburn and then becomes brown. Type III is a type of skin that does not become red but becomes melanized. As described above, the MED is used to calculate the SPF. As described above, since the information concerning UV radiation and the like is stored in the data storage unit 130, for example, communication with an external server to obtain information is not required. Accordingly, since communication expenses do not arise or communication processing is not required, the CPU 102 is not burdened. Additionally, because an external apparatus such as a server is not required, the cost of structuring or maintaining equipment is not high.

Figure 9:
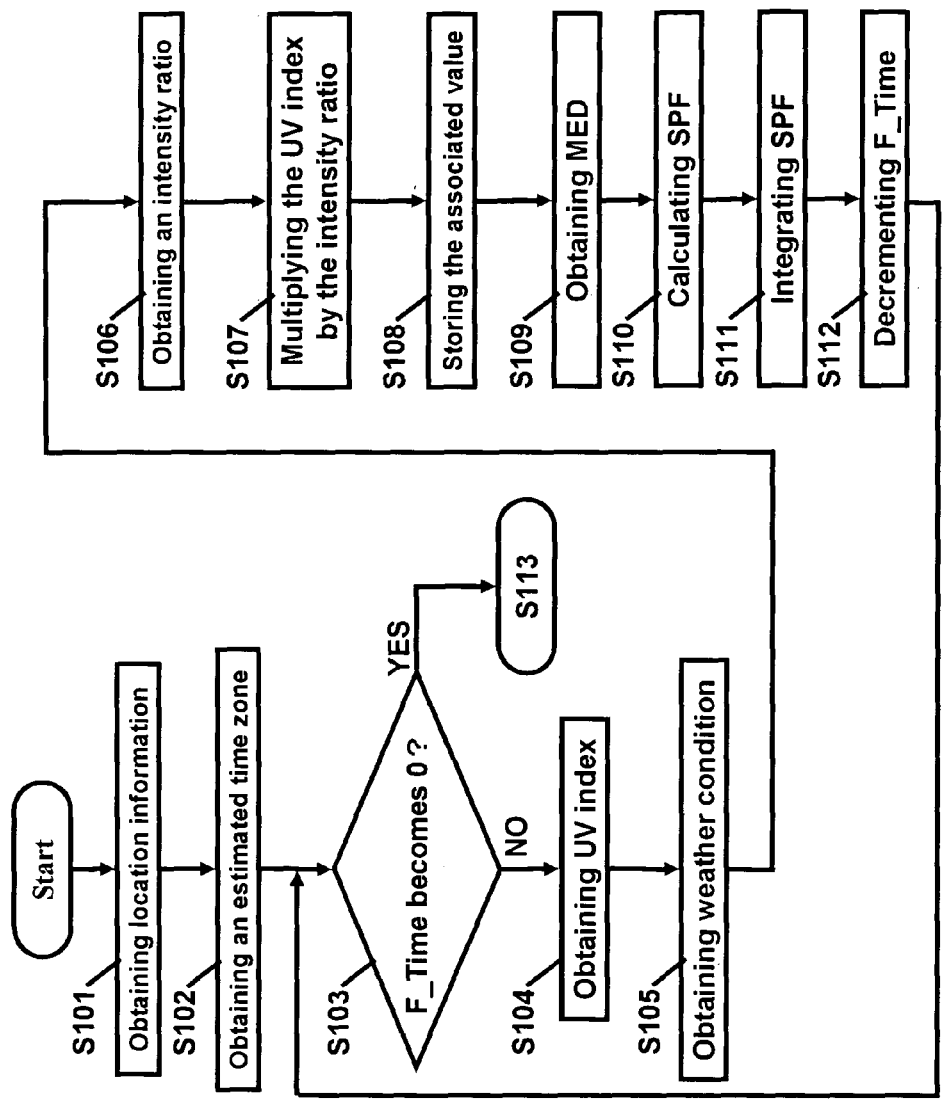
FIG. 9 is a first flowchart of processing of estimating the UV-information value.

Entire Flow According to First Embodiment:

Estimation processing of a UV information value will be described below with reference to FIGS. 9 and 10. Here, the UV information value is a generic term including the UV index, the SPF, and the PA described above.

In step S101, the location-information-obtaining unit 116 obtains location information through the communication unit 112. The location information can be obtained from a base station or a global positioning system (GPS) as, for example, information concerning latitude and longitude. Additionally, for example, information input from the control unit 110 by the user can be used as the location information. The control unit 110 is an input device. The process proceeds to step S102.

In step S102, the date-and-time-information-obtaining unit 118 obtains an estimated time zone input from the control unit 110 by the user. The estimated time zone is a period predetermined by the user. The estimated time zone is represented as, for example, "10 to 13". The process proceeds to step S103.

In step S103, the CPU 102 determines whether F_Time becomes 0 or not. F_time represents the number of hours included in the estimated time zone. For example, when the estimated time zone is "10 to 13" as described above, F_time is 3. Every time information corresponding to an ultra violet ray intensity for one of the hours is obtained, F_time is decremented. That is, a case where F_time becomes 0 indicates that the acquisition of the UV information value for the time zone specified by the user has been completed. When F_time becomes 0, the process proceeds to step S113 in FIG. 13. In contrast, when F_time does not become 0, the process proceeds to step S104.

In step S104, the comparative-data-selecting unit 120 obtains Position_ID using the location data 132 on the basis of the location information obtained in step S101. Furthermore, the comparative-data-selecting unit 120 obtains a UV index using the UV-radiation-intensity data 134 on the basis of the estimated time zone, which is obtained in step S102, and the Position_ID. The process proceeds to step S105.

In step S105, the weather-condition-obtaining unit 122 obtains a weather condition. The weather condition can be input from the control unit 110 by the user. The weather condition can also be obtained through the communication unit 112 as information provided by a weather company. The process proceeds to step S106.

In step 106, the UV-radiation-information-value-estimation-processing unit 124 obtains an intensity ratio corresponding to the weather condition using the UV-radiation-intensity-ratio data 136 on the basis of the weather condition obtained by the weather-condition-obtaining unit 122 in step S105. The process proceeds to step S107.

In step S107, the UV-radiation-information-value-estimation-processing unit 124 multiplies the UV index, which is obtained by the comparative-data-selecting unit 120 in step S104, by the intensity ratio obtained in step 106 to obtain a value. The process proceeds to step S108.

In step S108, the UV-radiation-information-value-estimation-processing unit 124 associates the value obtained in step S107 with a corresponding time and then stores the associated value in the nonvolatile memory 106. The process proceeds to step S109.

In step S109, the UV-radiation-information-value-estimation-processing unit 124 obtains an MED using the MED data 138 for each skin type on the basis of a skin type input from the control unit 110 by the user. The process proceeds to step S110.

In step S110, the UV-radiation-information-value-estimation-processing unit 124 calculates an SPF. The process proceeds to step S111.

In step S111, the UV-radiation-information-value-estimation-processing unit 124 obtains accumulation of the calculated SPFs and then stores the integrated SPF in the nonvolatile memory 106. The process proceeds to step S112.

In step S112, the CPU 102 decrements F_time. The process returns to step S103. In this manner, the above-described process is repeated until F_time becomes 0, i.e., until UV information values whose number is equal to the number of hours in the estimated time zone specified by the user, is obtained. Then, in step S103, when the CPU 102 determines that F_time has become 0, the process proceeds to step S113 in FIG. 10.

Figure 10:
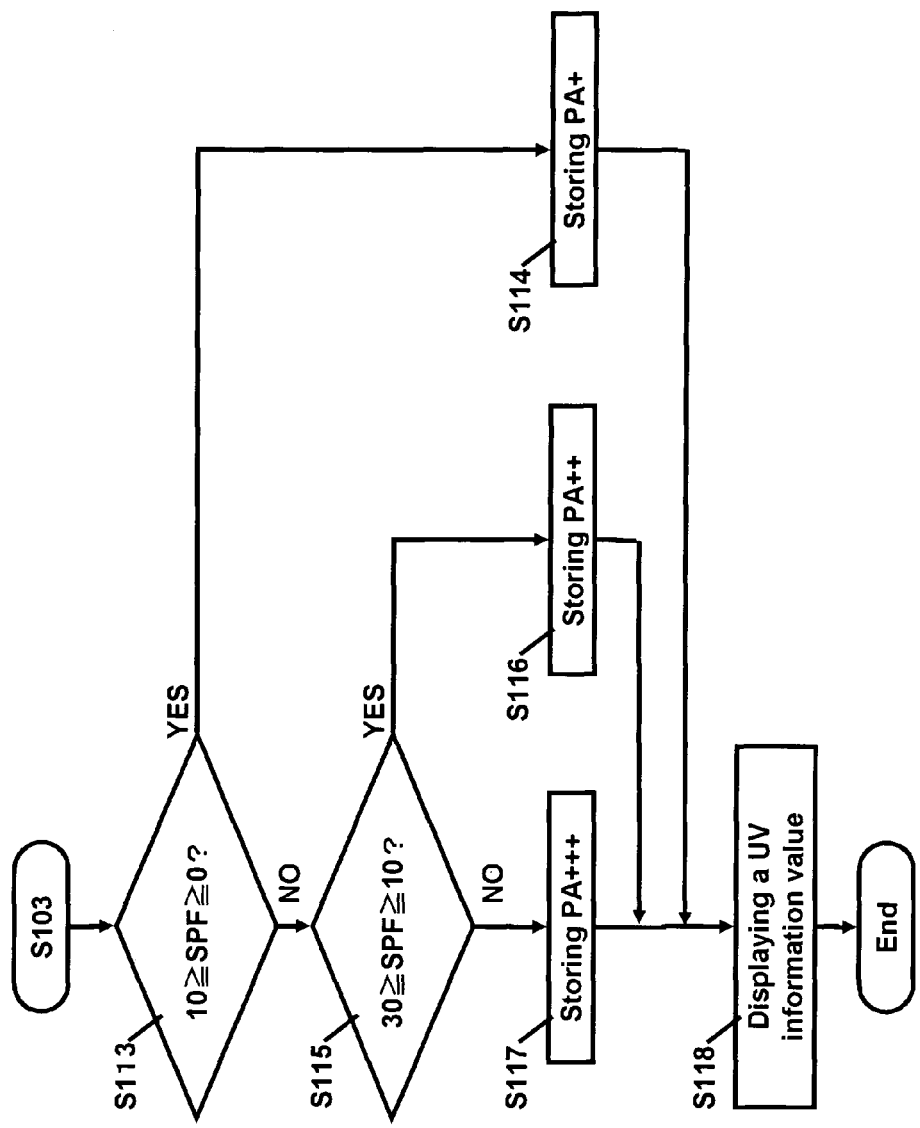
FIG. 10 is a second flowchart of processing of estimating the UV-information value.
Figure 11:
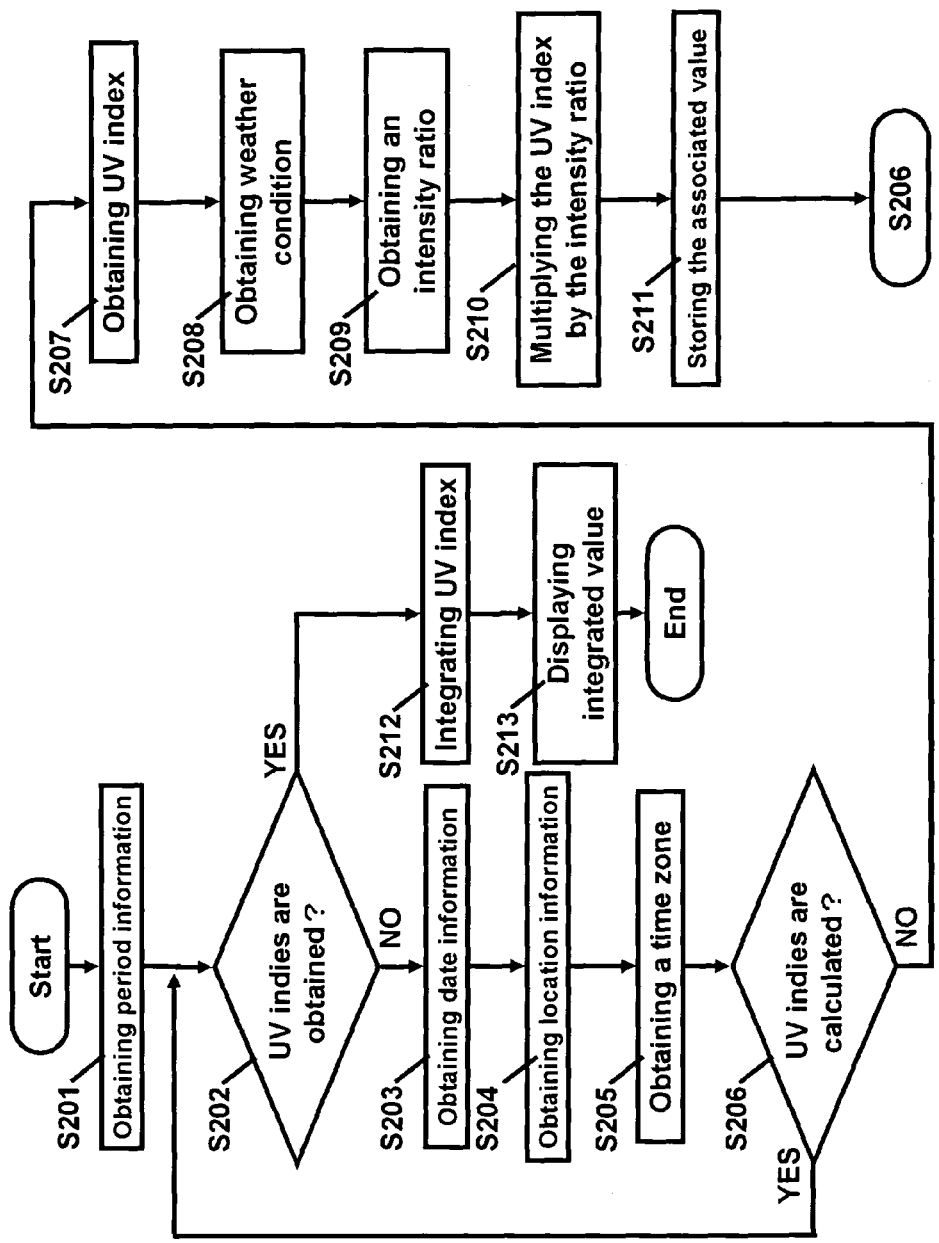
FIG. 11 is a flowchart of processing of obtaining a UV-information value.

In step S113 in FIG. 10, the UV-radiation-information-value-estimation-processing unit 124 determines whether or not the integrated SPF, which is stored in the nonvolatile memory 106, is more than or equal to 0 and less than 10. When the integrated SPF is more than or equal to 0 and less than 10, the process proceeds to step S114, and the UV-radiation-information-value-estimation-processing unit 124 stores the symbol PA+ in the nonvolatile memory 106. In contrast, when the integrated SPF is not more than or equal to 0 and less than 10, the process proceeds to step S115.

In step S115, the UV-radiation-information-value-estimation-processing unit 124 determines whether or not the integrated SPF, which is stored in the nonvolatile memory 106, is more than or equal to 10 and less than 30. When the integrated SPF is more than or equal to 10 and less than 30, the process proceeds to step S116, and the UV-radiation-information-value-estimation-processing unit 124 stores the symbol PA++ in the nonvolatile memory 106. In contrast, when the integrated SPF is not more than or equal to 10 and less than 30, the process proceeds to step S117.

In step S117, the UV-radiation-information-value-estimation-processing unit 124 stores the symbol PA+++ in the nonvolatile memory 106. The process proceeds to step S118.

In step S118, the UV-radiation-information-reporting unit 126 displays a UV information value on the display unit 104. Here, the displayed UV information value includes the UV index calculated in step S107, the SPF calculated in step S110, and the PA determined in steps S113 to 117. The process ends. In the first embodiment, the user can cope with problems on the basis of the UV information value.

Second Embodiment

Although the UV information value is obtained for the estimated time zone on the basis of the location data and the like in the first embodiment, another configuration is possible. In a second embodiment, an example of obtaining a UV information value for a certain period in the past and reporting the amount of UV radiation, to which the user is exposed in the certain period, to the user will be described.

Entire Flow According to Second Embodiment:

In step S201, the CPU 102 obtains period information input from the control unit 110 by the user. The period information concerns a period, for example, a period of a month in the past, and the user wants to obtain an integrated UV information value corresponding to the period. The process proceeds to step S202.

In step S202, the CPU 102 determines whether or not UV indices whose number is equal to the number of all of the days in the period defined by the period information, which is input by the user, is obtained. When UV indices whose number is equal to the number of all of the days in the period is obtained, the process proceeds to step S212. In contrast, when UV indices whose number is equal to the number of all of the days in the period is not obtained, the process proceeds to step S203.

In step S203, the date-and-time-information-obtaining unit 118 obtains date information using the period information input by the user. The process proceeds to step S204.

In step S204, the location-information-obtaining unit 116 obtains location information of the portable telephone 100 for the date defined by the date information obtained in step S203. The location information of the portable telephone 100 is stored as a history, for example, in the nonvolatile memory 106. The process proceeds to step S205.

In step S205, the date-and-time-information-obtaining unit 118 obtains information concerning a time zone in which the user was outside, which is input from the control unit 110 by the user. The date-and-time-information-obtaining unit 118 can obtain the information concerning the time zone in which the user was outside, i.e., the information concerning a time zone in which the user was exposed to UV radiation. The process proceeds to step S206.

In step S206, the CPU 102 determines whether or not UV indices whose number is equal to the number of all of the hours in the time zone in which the user was outside is obtained. When UV indices whose number is equal to the number of all of the hours in the time zone in which the user was outside is obtained, the process returns to step S203. In contrast, when UV indices whose number is equal to the number of all of the hours in the time zone in which the user was outside is not obtained, the process proceeds to step S207.

In step S207, the comparative-data-selecting unit 120 obtains a UV index on the basis of the date-and-time information obtained in step S203, the location information obtained in step S204, the information concerning the time zone in which the user was outside, which is obtained in step S205, and the UV-radiation-intensity data 134 for all days every month. The process proceeds to step S208.

In step S208, the weather-condition-acquiring unit 122 obtains a weather condition. In the second embodiment, in order to obtain information for the past, the weather condition can be obtained on the basis of information provided by a weather company through the communication unit 112. The process proceeds to step S209.

In step S209, the UV-radiation-information-value-estimation-processing unit 124 obtains an intensity ratio corresponding to the weather condition using the UV-radiation-intensity-ratio data 136 on the basis of the weather condition, which is obtained by the weather-condition-obtaining unit 122 in step S208. The process proceeds to step S210.

In step S210, the UV-radiation-information-value-estimation-processing unit 124 multiplies the UV index, which is obtained by the comparative-data-selecting unit 120 in step S207, by the intensity ratio obtained in step 209 to obtain a value. The process proceeds to step S211.

In step S211, the UV-radiation-information-value-estimation-processing unit 124 associates the value obtained in step S210 with a corresponding time and then stores the associated value in the nonvolatile memory 106. The process returns to step S206, and one of UV information values for the specified time zone of a certain day is obtained. Furthermore, when UV information values whose number is equal to the number of all of the hours in the specified time zone of the certain day, the process returns to step S202. In this manner, UV information values whose number is equal to the number of all of the days in the specified period is obtained. When UV information values whose number is equal to the number of all of the days in the specified period is obtained, the process proceeds to step S212.

In step S212, the UV-radiation-information-value-estimation-processing unit 124 integrates the UV indices, which are stored in the nonvolatile memory 106, for the time zone in which the user was outside in the specified period. The process proceeds to step S213.

In step S213, the UV-radiation-information-reporting unit 126 displays the integrated value in step S212 on the display unit 104. The process ends. In the second embodiment, the user can know the amount of UV radiation to which the user is exposed for one month in the past, and cope with problems on the basis of the amount of UV radiation.

Third Embodiment

Although the weather condition is determined on the basis of the information input by the user or the information provided by a weather company in the first and second embodiments, another configuration is possible. In a third embodiment, a photo diode (PD) sensor 115 is added to the configuration, and a weather condition is determined on the basis of a UV index acquired by the PD sensor 115.

Figure 12:
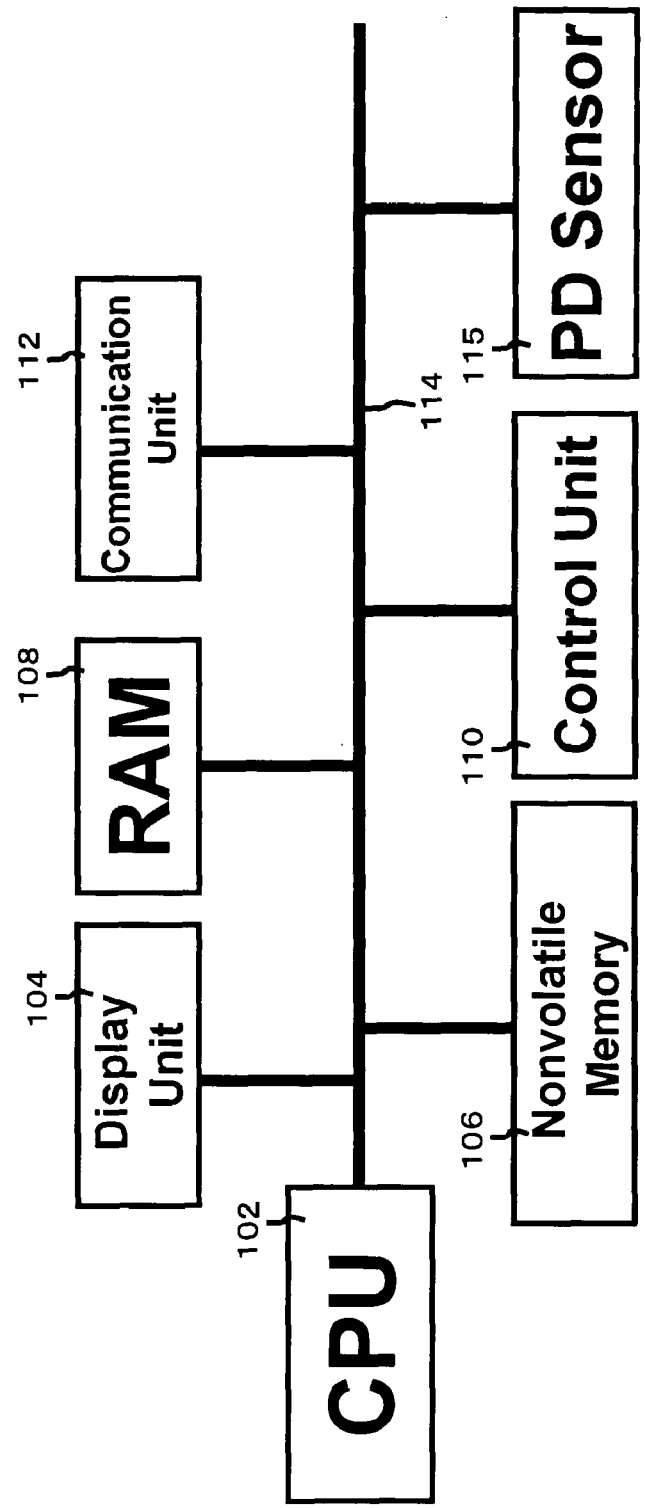
FIG. 12 is a diagram of a hardware configuration of an information terminal.

Hardware Configuration:

FIG. 12 shows a hardware configuration of a portable telephone that is a portable apparatus according to the third embodiment. The PD sensor 115 is newly added to the configuration described with reference to FIG. 1. The PD sensor 115 outputs the intensities of UVA and UVB radiations. Since the other elements of the configuration in the third embodiment are the same as those of the configuration described with reference to FIG. 1, the descriptions thereof are omitted.

Figure 13:
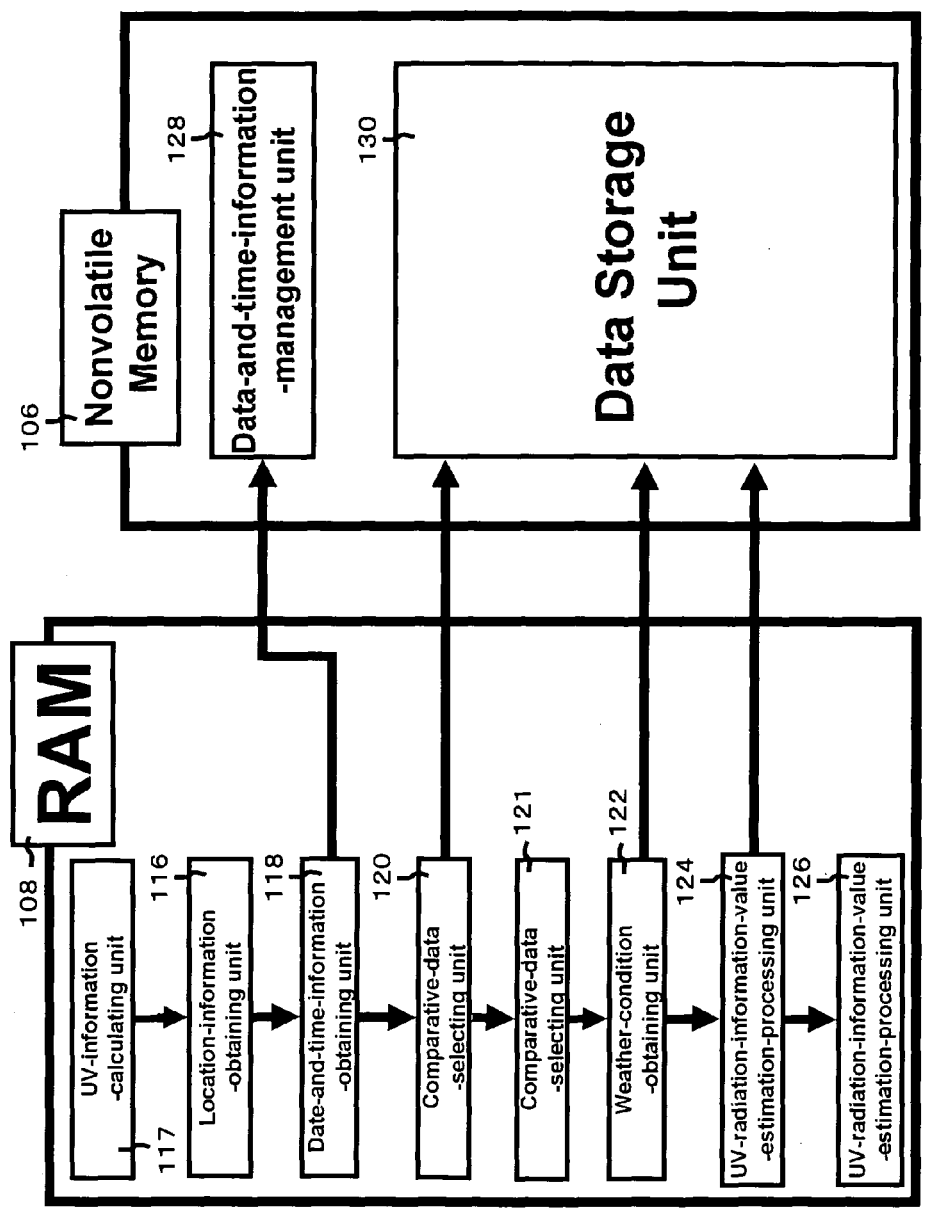
FIG. 13 is a function block diagram of processing of obtaining a UV-information value.

Processing of Estimating UV Information According to Third Embodiment:

FIG. 13 is a function block diagram simply showing an example of processing of estimating information concerning UV radiation according to the third embodiment.

A UV-information-calculating unit 117 and a weather-condition-determining unit 121 are newly added to the configuration described with reference to FIG. 2. The new elements in the configuration will be described. Since the other elements of the configuration in the third embodiment are the same as those of the configuration described with reference to FIG. 2, the descriptions thereof are omitted.

The UV-information-calculating unit 117 obtains a UV index on the basis of the intensities of UVA and UVB radiations.

The weather-condition-determining unit 121 calculates a ratio using the expression "(UV index obtained by the UV-information-calculating unit 117)/(UV index obtained by the comparative-data-selecting unit 120)". The weather-condition-determining unit 121 determines a weather condition on the basis of the above-described ratio and the UV-radiation-intensity-ratio data 136 for each weather condition.

Figure 14:
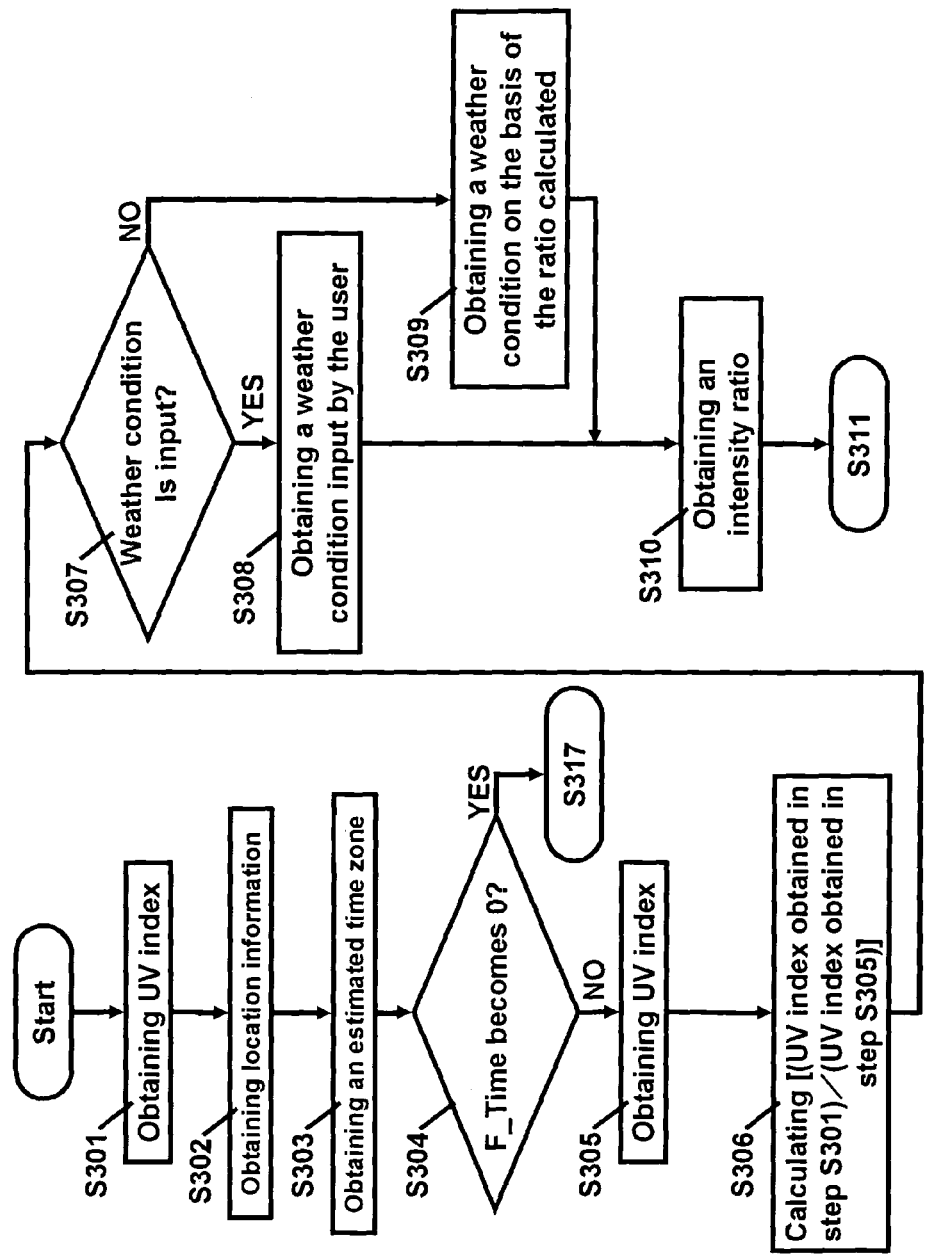
FIG. 14 is a first flowchart of processing of estimating the UV-information value.
Figure 15:
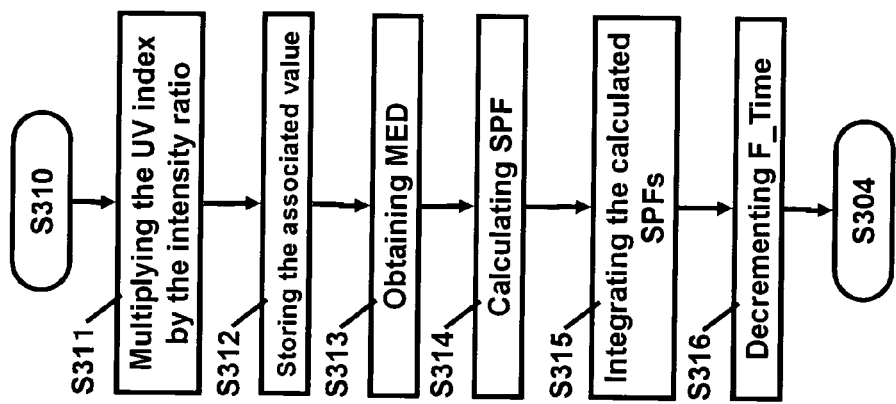
FIG. 15 is a second flowchart of processing of estimating the UV-information value.

Entire Flow According to Third Embodiment:

Estimation processing of a UV information value will be described below with reference to FIGS. 14, 15, and 16.

In step S301, the UV-information-calculating unit 117 calculates a UV index on the basis of the intensities of UVA and UVB radiations. In the third embodiment, since the portable telephone includes the PD sensor 115, the intensity of UV radiation can be easily obtained. The process proceeds to step S302.

In step S302, the location-information-obtaining unit 116 obtains location information through the communication unit 112. The location information can be obtained from a base station or a GPS as, for example, information concerning latitude and longitude. The process proceeds to step S303.

In step S303, the date-and-time-information-obtaining unit 118 obtains an estimated time zone input from the control unit 110 by the user. The process proceeds to step S304.

In step S304, the CPU 102 determines whether F_Time becomes 0 or not. When F_time becomes 0, the process proceeds to step S317. In contrast, when F_time does not become 0, the process proceeds to step S305.

In step S305, the comparative-data-selecting unit 120 obtains Position_ID using the location data 132 on the basis of the location information obtained in step S302. Furthermore, the comparative-data-selecting unit 120 obtains a UV index using the UV-radiation-intensity data 134 on the basis of the estimated time zone, which is obtained in step S303, and the Position_ID. The process proceeds to step S306.

In step S306, the weather-condition-determining unit 121 calculates a ratio of the UV index obtained in step S301 to the UV index obtained in step S305. The process proceeds to step S307.

In step S307, the weather-condition-obtaining unit 122 whether or not a weather condition is input from the control unit 110 by the user. When a weather condition is input, the process proceeds to step S308. When a weather condition is not input, the process proceeds to step S309.

In step S308, the weather-condition-obtaining unit 122 obtains a weather condition input by the user. The process proceeds to step S310. In contrast, in step S309, the weather-condition-obtaining unit 122 obtains a weather condition on the basis of the ratio calculated in step S306 and the ultraviolet-radiation-intensity-ratio data 136. The process proceeds to step S310.

In step S310, the UV-radiation-information-value-estimation-processing unit 124 obtains an intensity ratio corresponding to the weather condition using the UV-radiation-intensity-ratio data 136 on the basis of the weather condition obtained by the weather-condition-obtaining unit 122. The process proceeds to step S311.

In step S311, the UV-radiation-information-value-estimation-processing unit 124 multiplies the UV index, which is obtained by the comparative-data-selecting unit 120 in step S305, by the intensity ratio obtained in step 310 to obtain a value. The process proceeds to step S312.

In step S312, the UV-radiation-information-value-estimation-processing unit 124 associates the value obtained in step S311 with a corresponding time and then stores the associated value in the nonvolatile memory 106. The process proceeds to step S313.

In step S313, the UV-radiation-information-value-estimation-processing unit 124 obtains a MED on the basis of a skin type input from the control unit 110 by the user. The process proceeds to step S314.

In step S314, the UV-radiation-information-value-estimation-processing unit 124 calculates an SPF. The process proceeds to step S315.

In step S315, the UV-radiation-information-value-estimation-processing unit 124 integrates the calculated SPFs in step S314 and then stores the integrated SPF in the nonvolatile memory 106. The process proceeds to step S316.

In step S316, the CPU 102 decrements F_time. The process returns to step S304.

Figure 16:
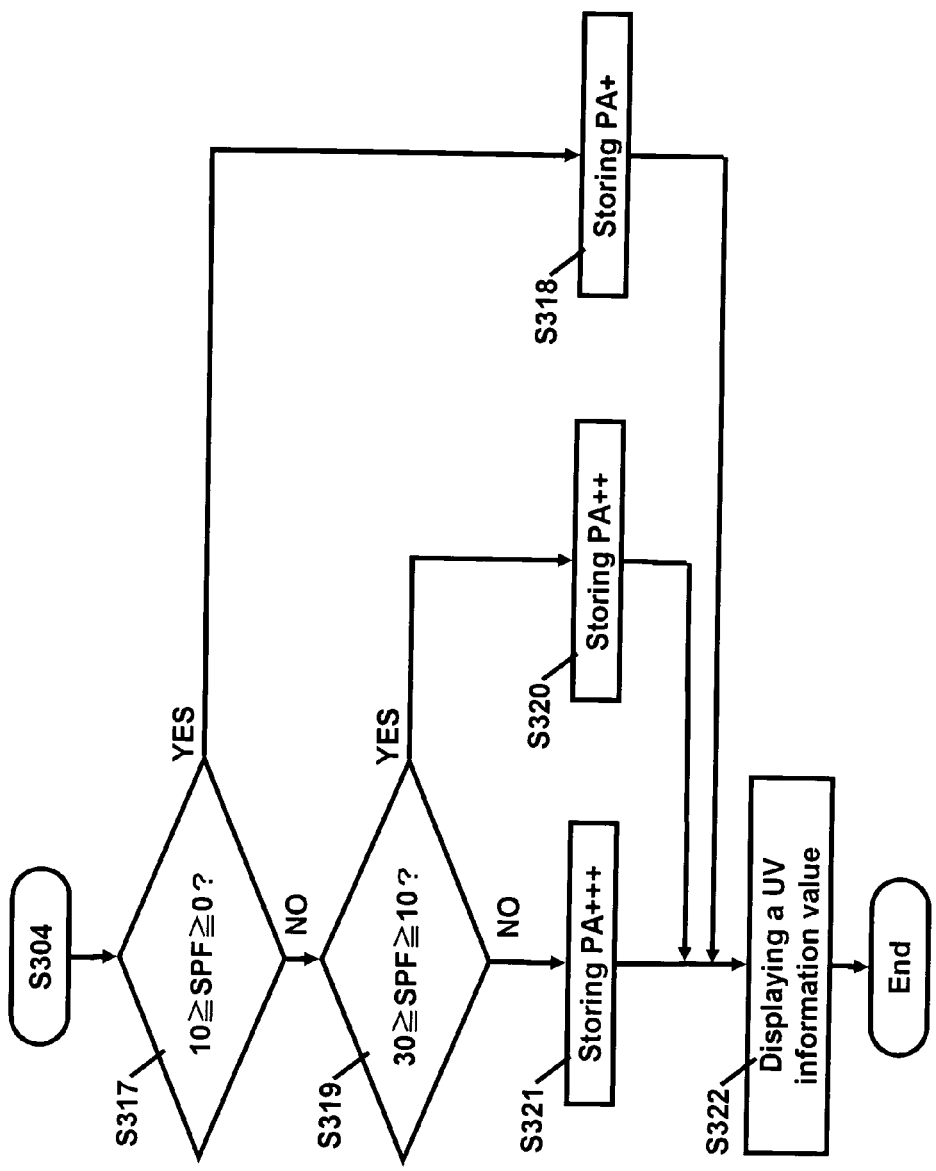
FIG. 16 is a third flowchart of processing of estimating the UV-information value.

In step S304, when the CPU 102 determines that F_time becomes 0, the process proceeds to step S317 in FIG. 16.

In step S317, the UV-radiation-information-value-estimation-processing unit 124 determines whether or not the integrated SPF, which is stored in the nonvolatile memory 106, is more than or equal to 0 and less than 10. When the integrated SPF is more than or equal to 0 and less than 10, the process proceeds to step S318, and the UV-radiation-information-value-estimation-processing unit 124 stores the symbol PA+ in the nonvolatile memory 106. In contrast, when the integrated SPF is not more than or equal to 0 and less than 10, the process proceeds to step S319.

In step S319, the UV-radiation-information-value-estimation-processing unit 124 determines whether or not the integrated SPF, which is stored in the nonvolatile memory 106, is more than or equal to 10 and less than 30. When the integrated SPF is more than or equal to 10 and less than 30, the process proceeds to step S320, and the UV-radiation-information-value-estimation-processing unit 124 stores the symbol PA++ in the nonvolatile memory 106. In contrast, when the integrated SPF is not more than or equal to 10 and less than 30, the process proceeds to step S321.

In step S321, the UV-radiation-information-value-estimation-processing unit 124 stores the symbol PA+++ in the nonvolatile memory 106. The process proceeds to step S322.

In step S322, the UV-radiation-information-reporting unit 126 displays a UV information value on the display unit 104. Here, the displayed UV information value includes the UV index calculated in step S311, the SPF calculated in step S314, and the PA determined in steps S317 to 321. The process ends.

In this manner, in the third embodiment, as described in step S307, the weather-condition-obtaining unit 122 can automatically obtain the weather condition without any weather condition input by the user. Accordingly, the user does not have any inconvenience of inputting a weather condition.

In the embodiments of the present embodiment, the intensity of UV radiation can be obtained on the basis of the prepared UV-radiation-intensity data, information including the location-and-time information corresponding to the UV-radiation-intensity data, the obtained location information, and the input time information. Accordingly, the intensity of UV radiation corresponding to the obtained location information and the input time information can be provided.

The embodiments described above are merely exemplary in nature and are in no way intended to limit the present invention. Accordingly, various modifications can be made without departing from the spirit and scope of the present invention.

What is claimed is:

1. An apparatus, comprising:
   an input device to input location information and time information; and
   a processor to obtain information of an ultra violet ray intensity based on the location information and the time information inputted using the input device, in reference to ultra violet information stored in a storage where ultra violet ray intensity values are stored in association with location information and time information, the ultraviolet ray intensity values having been measured for a predetermined interval in the past; and
   a display to display the information of the ultra violet ray intensity obtained by the processor.

2. The apparatus of claim 1, wherein the processor obtains information of accumulation of ultra violet intensities over a period predetermined by an input by the input device.

3. The apparatus of claim 1, wherein the storage further stores weather information in association with a value for correcting the ultra violet ray intensity, and the processor corrects the obtained information of the ultra violet ray intensity on the basis of weather information inputted by the input device and the weather information stored in the storage.

4. The apparatus of claim 1, wherein the storage further stores skin condition information in association with a value for correcting the ultra violet ray intensity, and the processor corrects the obtained information of the ultra violet ray intensity on the basis of skin condition information inputted by the input device and the skin condition information stored in the storage.

5. The apparatus of claim 1 the apparatus further comprising a communication unit for obtaining information wherein the location information is obtained by the communication unit.

6. The apparatus of claim 1, further comprising a sensor for obtaining an ultra violet ray intensity, wherein the processor calculates a ratio on the basis of the obtained information of the ultra violet ray information and the ultra violet ray intensity obtained by the sensor, and corrects the obtained information of the ultra violet ray information on the basis of the ratio.

7. A method of controlling an apparatus having an input device to input information and a display to display information, the method comprising:
inputting location information and time information;
obtaining information of an ultra violet ray intensity based on the location information and the time information inputted using the input device in reference to ultraviolet information stored in a storage where ultra violet ray intensity values are stored in association with location information and time information, the ultraviolet ray intensity values having been measured for a predetermined interval in the past; and
displaying the obtained information of the ultra violet ray intensity on the display.

8. The method of claim 7, wherein the obtaining obtains information of accumulation of ultra violet intensities over a period predetermined by an input by the input device.

9. The method of claim 7, wherein the storing further stores weather information in association with a value for correcting the ultra violet ray intensity.

10. The method of claim 9, further comprising correcting the obtained information of the ultra violet ray intensity on the basis of weather information inputted by the input device and the weather information stored in the storage.

11. The method of claim 7, wherein the storing further stores skin condition information in association with a value for correcting the ultra violet ray intensity.

12. The method of claim 11, further comprising correcting the obtained information of the ultra violet ray intensity on the basis of skin condition information inputted by the input device and the skin information stored in the storage.

13. The method of claim 7, the apparatus further comprising a communication unit for obtaining information wherein the location information is obtained by the communication unit.

14. The method of claim 7, the apparatus further comprising a sensor for obtaining an ultra violet ray intensity, further comprising calculating a ratio on the basis of the obtained information of the ultra violet ray information and the ultra violet ray intensity obtained by the sensor, and correcting the obtained information of the ultra violet ray information on the basis of the ratio.

15. A computer-readable recording medium that stores a computer program to control an apparatus, the apparatus having an input device to input information and a display for displaying information, according to a process comprising;
inputting location information and time information;
obtaining information of an ultra violet ray intensity based on the location information and the time information inputted by the input device in reference to ultra-violet information stored in a storage where ultra violet ray intensity values are stored in association with location information and time information, the ultraviolet ray intensity values having been measured for a predetermined interval in the past; and
displaying the obtained information of the ultra violet ray intensity on the display.

16. The computer-readable recording medium of claim 15, wherein the obtaining obtains information of accumulation of ultra violet intensities over a period predetermined by an input by the input device.

* * * * *

UNITED STATES PATENT AND TRADEMARK OFFICE
CERTIFICATE OF CORRECTION

| | | |
|---|---|---|
| PATENT NO. | : 7,728,305 B2 | Page 1 of 1 |
| APPLICATION NO. | : 12/068461 | |
| DATED | : June 1, 2010 | |
| INVENTOR(S) | : Koichiro Kasama | |

It is certified that error appears in the above-identified patent and that said Letters Patent is hereby corrected as shown below:

Column 11, Line 4 delete "claim 1" and insert --claim 1,--, therefor.

Signed and Sealed this

Twenty-third Day of November, 2010

David J. Kappos
*Director of the United States Patent and Trademark Office*